US009665465B1

(12) United States Patent
Jain et al.

(10) Patent No.: US 9,665,465 B1
(45) Date of Patent: May 30, 2017

(54) AUTOMATED DETERMINATION OF APPLICATION PERMISSIONS

(71) Applicant: Amazon Technologies, Inc., Reno, NV (US)

(72) Inventors: Akshay Jain, New Delhi (IN); Nitin Kumar Grover, Gurgaon (IN)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 13/681,404

(22) Filed: Nov. 19, 2012

(51) Int. Cl.
*G06F 21/53* (2013.01)
*G06F 11/36* (2006.01)
*G06F 21/62* (2013.01)

(52) U.S. Cl.
CPC ...... *G06F 11/3612* (2013.01); *G06F 11/3604* (2013.01); *G06F 21/629* (2013.01); *G06F 2221/033* (2013.01); *G06F 2221/2141* (2013.01)

(58) Field of Classification Search
CPC .. G06F 21/53; G06F 21/629; G06F 2221/033; G06F 2221/2141
See application file for complete search history.

(56) References Cited

U.S. PATENT DOCUMENTS

| 8,572,178 | B1 | 10/2013 | Frazzini et al. | |
|---|---|---|---|---|
| 9,137,262 | B2 * | 9/2015 | Qureshi | H04L 63/20 |
| 2002/0138441 | A1 * | 9/2002 | Lopatic | G06F 21/125 |
| | | | | 705/59 |
| 2008/0250493 | A1 * | 10/2008 | Bassani | G06F 21/604 |
| | | | | 726/17 |
| 2010/0088683 | A1 * | 4/2010 | Golender | G06F 9/4446 |
| | | | | 717/128 |
| 2013/0160147 | A1 * | 6/2013 | Draluk | G06F 21/51 |
| | | | | 726/30 |
| 2013/0212684 | A1 * | 8/2013 | Li | G06F 17/30522 |
| | | | | 726/25 |

(Continued)

OTHER PUBLICATIONS

Felt et al., "Android Permissions Demystified" (2011), Proceedings of the 18th ACM conference on Computer and communications security, pp. 627-638 [retrieved from http://dl.acm.org/citation.cfm?id=2046779].*

(Continued)

*Primary Examiner* — Brian W Wathen
(74) *Attorney, Agent, or Firm* — Athorus, PLLC

(57) ABSTRACT

This disclosure describes, in part, a system and process that allows for the automated review of a submitted application to determine the actually requested permissions and identify differences between the requested permissions and a submitted permissions list associated with the application. For example, when an application is submitted for review or approval it may include a submitted permissions list identifying the permissions that are to be associated with the application. In some instances, the permissions included in the submitted permissions list may not correspond with the permissions actually needed for proper operation of the application—there may be omitted permissions that should be included and/or permissions included in the permissions list that are never requested by the application. This disclosure describes, in part, a system and process for confirming that the appropriate permissions are included in the submitted permissions list.

20 Claims, 5 Drawing Sheets

(56) References Cited

U.S. PATENT DOCUMENTS

2014/0075420 A1* 3/2014 Queru .................. G06F 9/4411
                                                                    717/134

OTHER PUBLICATIONS

Centonze et al., "Combining Static and Dynamic Analysis for Automatic Identification of Precice Acess-Control Policies" (2007), pp. 1-10 [retrieved from https://www.acsac.org/2007/papers/175.pdf].*

U.S. Appl. No. 13/074,723, filed Mar. 29, 2011, Ameesh Paleja, "Automated Selection of Quality Control Tests to Run on a Software Application."

* cited by examiner

AUTOMATED DETERMINATION OF APPLICATION PERMISSIONS

BACKGROUND

With the continually increasing use and variety of mobile devices, developers and other entities are constantly creating applications accessible for use by third parties. To facilitate this expansion, many of the operating system providers (e.g., Microsoft, Google, Apple) have established development environments, sometimes referred to as software development kits or SDKs, that specify the structure and form in which applications are to be developed and submitted to enable proper and consistent operation on the different operating system platforms. These development environments have also allowed developers and other individuals to quickly create applications by utilizing segments of common code. When common segments of code are used, the developer may disable portions of that common code that are not utilized by their application, but otherwise leave the code intact. For example, this may be done by commenting out segments of the code, setting a flag so the unneeded sections of the common code are never called, etc. As a result, many applications are developed in a manner such that portions of the application code are not utilized.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
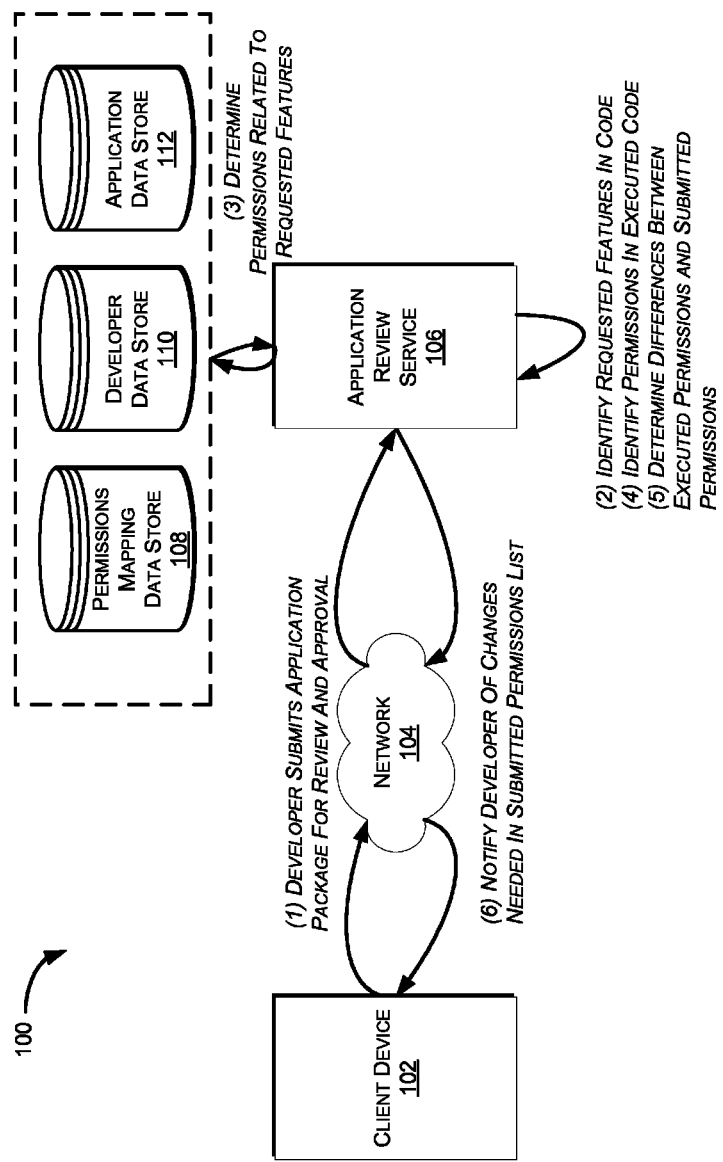
FIG. 1 is a pictorial diagram of an example environment illustrating the submission and review of an application to determine permissions to be associated with the application, in accordance with an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes, in part, a system and process that reviews application packages to identify differences between the features actually requested by the application when running and the permissions for those features that may be associated with and submitted with the application. For example, an application review service may process application code to identify all features referenced in the code, test the code to determine which of those features may actually be requested by the application when the application is running and then compare the results with the submitted list of permissions to ensure that only permissions for features actually requested by the application are included. Matching the permissions associated with an application to just those for features actually requested when the application is running ensures that the application will properly receive access to requested features and improve the ability to appropriately identify which devices are capable of properly running the application.

In many operating environments, applications are submitted as a package file, such as an Android application package (APK) file, a Windows application package file or an Apple application package file, that includes the application code and associated information. To facilitate discussion for this disclosure, the implementations described herein will be discussed with respect to the Android APK file. However, it will be appreciated that any type of application may be utilized with the implementations described herein and the use of the Android APK file is for illustration purposes only.

The APK file is the file format used to distributed and install application software and middleware on Google's Android operating system. When an application program code is compiled, it and all the associated parts are packaged into a single APK file for submission. The associated parts may include the program code (such as a .dex file), resources, assets, certificates, and manifest file. APK files are zip file formatted packages based on the JAR file format.

The manifest file is an XML file included in the APK file and associated with the application. The manifest file includes information about the application that is needed for the application to run on a device. For example, the manifest file names the package for the application and describes the components of the application—the activities, services, broadcast receivers, and content providers of which the application is composed. The manifest file also names the classes that implement each of the components and publishes their capabilities. These declarations let the Android system know what the components are and under what conditions they can be launched. The manifest file also determines which processes on a device will host application components and declares which permissions the application must have in order to access protected parts of the application programming interface (API) and interact with other applications. Likewise, the manifest file also identifies the permissions that other applications are required to have in order to interact with the application's components. The manifest file may also list the instrumentation classes that provide profiling and other information as the application is executing and identifies the minimum level of the Android API that the application requires to operate properly. Finally, the manifest file may list the libraries to which the application is to be linked.

A "permission," as used herein, is a restriction limiting access to a part of the code on the device, data on the device, data accessible by the device, and/or services accessible by the device. For example, a permission may be specified to restrict access to the code that will call emergency numbers, to read owner data, set wallpaper on the device, power on/off the device, track a location of the device, etc. For an application to access a feature protected by a permission, the requested permission must be included in the manifest file. For purposes of this disclosure, requested permissions, such as those included in the manifest file of an APK, will be referred to herein generally as a "submitted permissions list."

In addition to controlling access to protected features, permissions may also be used to determine application compatibility with different devices. For example, if a permission is included in the submitted permissions list for access to a camera of the device, only devices with a camera will be identified as compatible. Likewise, some or all permissions included in a submitted permissions list may also be presented with the application in an application store thereby allowing the user to decide whether to download and install the application. For example, if a permission for accessing user information is included in the submitted permissions list, an application store offering the application to users may identify on an information page associated with the application that the application request access to user information.

In still other implementations, some permissions may identify potential security risks or result in an application being marked as potentially malware. For example, if an application includes a permission for determining device location and/or user information, it may be flagged for additional review because the device location and/or user information may be a potential security risk. In some instances, these potential security risks may be determined based on the type of application requesting the permission. For example, it may not be considered a potential security risk for a map based application to request a permission to access device location, but it may be a security risk for a weight tracking application to include such a permission.

Because permissions may be used to not only restrict access to certain features but to also identify compatible devices as well as inform users as to what features may be requested by the application, a need exists to ensure that the submitted permissions list includes all permissions for features that may be called by the application but does not include permissions for features that are not called by the application. Omitting permissions for features that may be called by an application when running will result in the application failing, closing other otherwise not operating property—a bad user experience. Likewise, including permissions for features that will not be called by the application potentially results in the application undergoing additional security review, being eliminated for a segment of devices for which it is actually compatible, and/or generating distrust in the individual when the feature is listed with information about the application—all of which are also bad user experiences.

FIG. 1 is a pictorial diagram of an example environment 100 illustrating the submission and review of an application to determine permissions to be associated with the application, in accordance with an implementation. The example environment 100 includes a client device 102 and an application review service 106 communicatively connected via a network 104.

Although the environment is illustrated as including a single client device 102 and a single application review service, in other implementations any number of client devices and/or application review services may be utilized. The network 108 may include a local area network, a wide area network, such as a public switched telephone network (PSTN), a cable television network, a satellite network, a collection of networks, a public Internet Protocol (IP) network, a private IP network, or a combination thereof. Moreover, the network 108 may be wired, wireless, or a combination of the two.

The environment 100 also includes a permissions mapping data store 108, developer data store 110, and an application data store 112. The permissions mapping data store 108 stores a mapping between the different requests for features, e.g., API calls, that may be included in the code of an application, to each of the different permissions. The developer data store 110 may include information about developers, such as the number of applications submitted, the number of approved applications, the number and frequency of rejected applications, differences between the submitted permissions list provided by the developer or other entity and the requested permissions for features actually called by the application when it is running, etc. The application data store 112 may store application packages that have been reviewed and have no differences between the requested permissions list and the submitted permissions list.

As used in this disclosure, the data stores may include lists, arrays, databases, and other data structures used to provide storage and retrieval of data. Likewise, while the disclosure describes multiple data stores, in some implementations the data stores may be configured as a single data store or multiple data stores. The mapping data store 108, developer data store 110, and the application data store 112 may be integrated with the application review service 106 or otherwise communicatively coupled with the application review service 106.

In some implementations, the mapping data store 108, developer data store 110, and the application data store 112 may include one or more CD-RW/DVD-RW drives, hard disk drives, tape drives, or other storage devices that are utilized to store digital content and information. The application review service 106, separately or together with the mapping data store 108, developer data store 110, and the application data store 112 may provide an service that facilitates the review and determination of the permissions actually requested by an application when running.

The client device 102 may include a personal computer, a tablet computer, an eBook reader device, a laptop computer, a desktop computer, a netbook, a personal digital assistant (PDA), a portable gaming device, a wireless communication device, such as a smart phone or mobile handset, a set-top-box, a game console, an in-store kiosk, any combination thereof or any other form of computing device from which an application may be submitted. In addition to communicating via the network 108, the client device 104 may communicate with the application review service 106 via peer-to-peer wired or wireless connections.

Regardless of the network 108 utilized, the client device 104 may be configured to provide an application and optionally a submitted permissions list for review by the application review service 106.

Returning to FIG. 1, when a client device 102 submits an application package via the network 104 for review by the application review service 106, the application review service 106 may automatically begin review of the application package. Included in that review may be an automated review of the submitted permissions list to ensure that the features actually requested by the application when running correspond with those that are included in the submitted permissions list. In some implementations, this may be a completely automated process.

The review process may begin with a review of the application code. For example, each line of the code may be reviewed to identify API calls, or other requests for features. For each identified API call, the application review service 106 may query the permissions mapping data store to identify whether a mapping between the API call and a permission exists. The identified permission may then be included in the code based permissions list. If no mapping is included in the permissions mapping data store, the identified API call or other request for a feature may be marked for manual review.

Upon completion of the application code review, the code based permission list will identify the permission for each API call or other request for a feature included in the application code. However, in some instances, portions of code of an application may not be active, may be flagged as a comment or otherwise may never execute when the application is running. Because of this, one or more of the permissions included in the code based permissions list may not be necessary for proper operation of the application.

To identify which permissions included in the code based permissions list are necessary for proper operation of the application, the application review service 106 may run the application and test each permission. The application review service 106 may run the application on an emulator or other virtual instance of a device, utilize the code based permissions list as the permissions for the application and sequentially remove each permission from the permissions list to determine if the permission is needed. For example, the application review service 106 may remove one of the permissions from the code based permissions list, run the application in a manner that should result in the relevant portion of code executing and monitor the application for a failure, fatal exception, force closure, log file, or other indicator that the code attempted to execute but did not have the necessary permissions to access the requested feature.

If the relevant portion of the code executes and the running application attempts to access the restricted feature but fails because the permission was removed, the permission is added to a requested permissions list and identified as necessary for proper operation of the application. However, if the application runs and the relevant portion of the code does not execute, the restricted feature is not requested and/or the application does not fail or otherwise identify that the permission is needed, the removed permission may be added to an unused permissions list.

For each permission included in the code based permissions list, the application review service 106 may remove the permission and determine if the permission is necessary for proper operation of the application. Once each permission from the code based permissions list has been tested and the requested permissions list completed, the requested permissions list will include only those permissions for features that are actually requested by the application when the application is running In some implementations, as illustrated in FIG. 1, the application review service 106 may compare the requested permissions list with the submitted permissions list to identify any differences. For example, the submitted permissions list may include permission requests for features that are never actually called by the application. In other instances, the submitted permissions list may be missing one or more permissions that are needed for proper operation of the application because the feature restricted by the permission is actually called by the application when it is running. In still other instances, the submitted permission list may include both unused permissions as well as missing permissions that are needed.

Once the differences between the requested permissions list and the submitted permissions list are determined, if any exist, the application review service 106 may reject the application and notify the entity that submitted the application of the identified differences. The entity may then update and resubmit the application with the corrected submitted permissions list. In some instances, the application review service 106 may also record information about the submitted and rejected application in the developer data store 110, identifying the developer or other entity that submitted the application and the difference between the submitted permissions list and the requested permissions list. Such information may be used, for example, to identify developers or other entities that may benefit from additional training, support or other services to improve their developed applications and increase the efficiency of the application review process.

If no differences between the submitted permissions list and the requested permissions list are identified, the application package may be added to the application data store 112. In some implementations, the application may be approved and made available for access by other users. In other implementations, additional review, either automated and/or manual, may be performed before the application is approved for access and use by other users. For example, one or more of the permissions included in the requested permissions list may be identified as a potential security risk that may require additional review before the application is approved. Such permissions may include, without limitation, permissions for personal information or to determine a device location.

Figure 2:
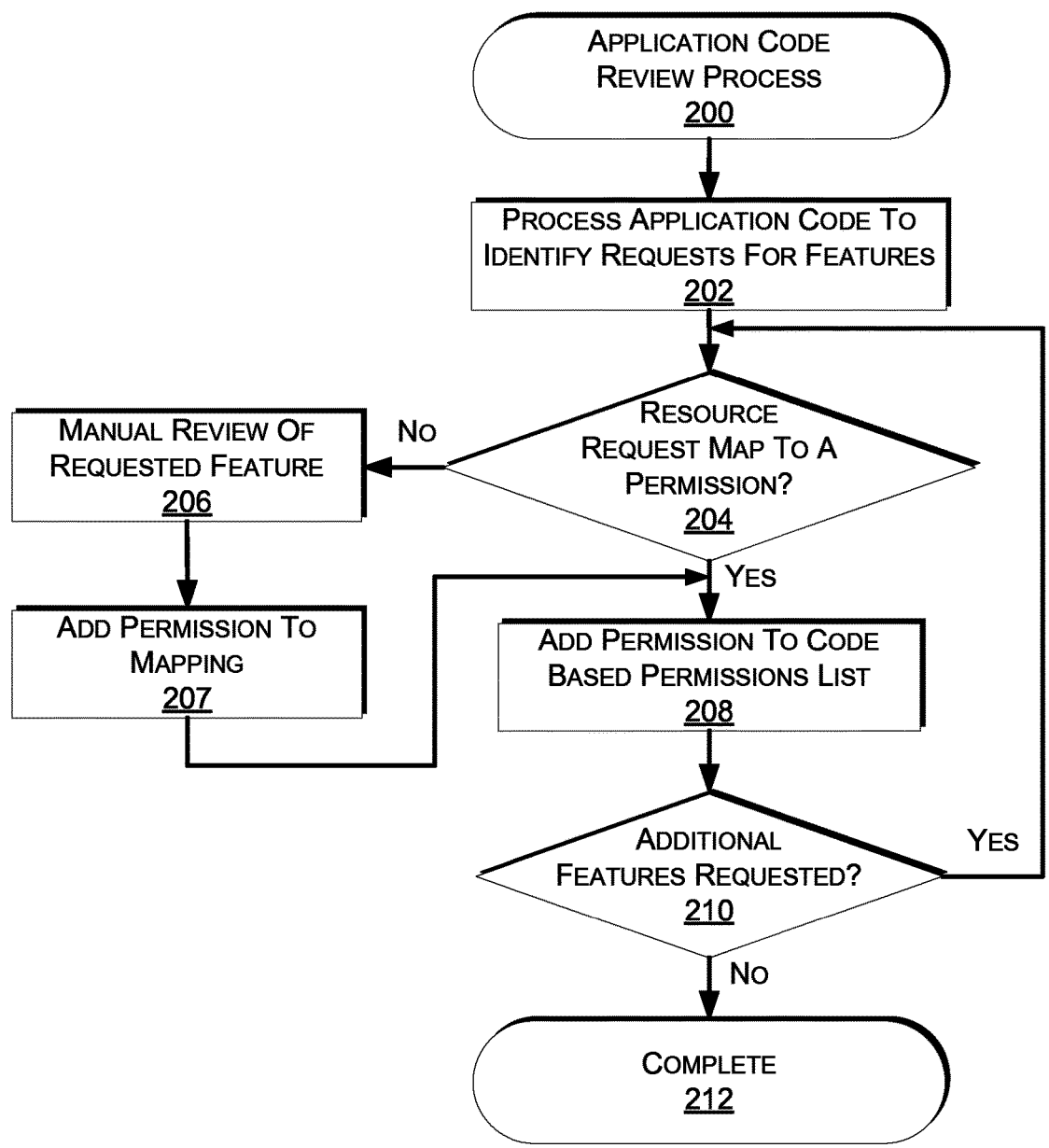
FIG. 2 is a flow diagram of an example process for application code review to identify feature requests included in the code, in accordance with an implementation.

FIG. 2 is a flow diagram of an example process 200 for application code review to identify resource requests included in the code, in accordance with an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process.

Returning to FIG. 2, when an application is received for review by the application review service 106, the example process 200 processes the application code to identify requests for features, as in 202. Requests for features may be in the form of an API call or any other instruction requesting access to code on the device, data on the device, data accessible by the device, and/or services accessible by the device. In some implementations, the example process 200, as well as the example process 300 may be performed by the application review service 106 operating on a server system, such as that described with respect to FIG. 5. In other implementations, either or both of example process 200 and example process 300 may be performed by a service operating on the client device 102 or another device that is in communication with the client device 102. In such an implementation, the example processes 200, 300 may operate as part of, or in conjunction with, a SDK to allow developers to determine the necessary permissions for an application before it is submitted for review and approval.

For each identified feature, the example process 200 determines whether a mapping to a corresponding permission is available, as in 204. For example, as discussed above, mappings between features and permissions may be included in a permissions mapping data store 108 that is accessible by the application review service 106. If it is determined that a mapping for the feature is not available, the example process 200 may flag the feature for manual review to determine an appropriate permission, as in 206. When the manual mapping of a feature to a permission is completed, the mapping may be added to the mappings data store and used for automated review in the future by the application review service 106, as in 207.

If it is determined that a mapping between the feature and a permission is available, or upon manual mapping between a requested feature and a permission has been determined, the identified permission is added to a code based permissions list, as in 208. As discussed herein, a code based permissions list includes a list of all permissions that are associated with a feature identified in the code of an application. Once the permission has been added to the code based permissions list, a determination is made as to whether additional features are requested in the application code, as in 210. If it is determined that additional features are requested in the code that are not yet mapped to a permission, the example process 200 returns to decision block 204 and continues for each additional feature identified in the application code.

If it is determined that no additional features are requested in the application code, the example process 200 completes, as in 212. Upon completion of the example process 200, the code based permissions list includes an identification of all permissions that may be necessary for properly running the application. However, because the application code may include segments that are never executed when the application is running (e.g., the segment may be commented out or otherwise disabled), the code based permissions list may include permissions that are not needed for the application to run properly. As such, the application review service 106 may further review the code based permissions list and/or the application to identify any permissions that are not needed, such as by completing the dynamic application review process 300, discussed below.

Figure 3:
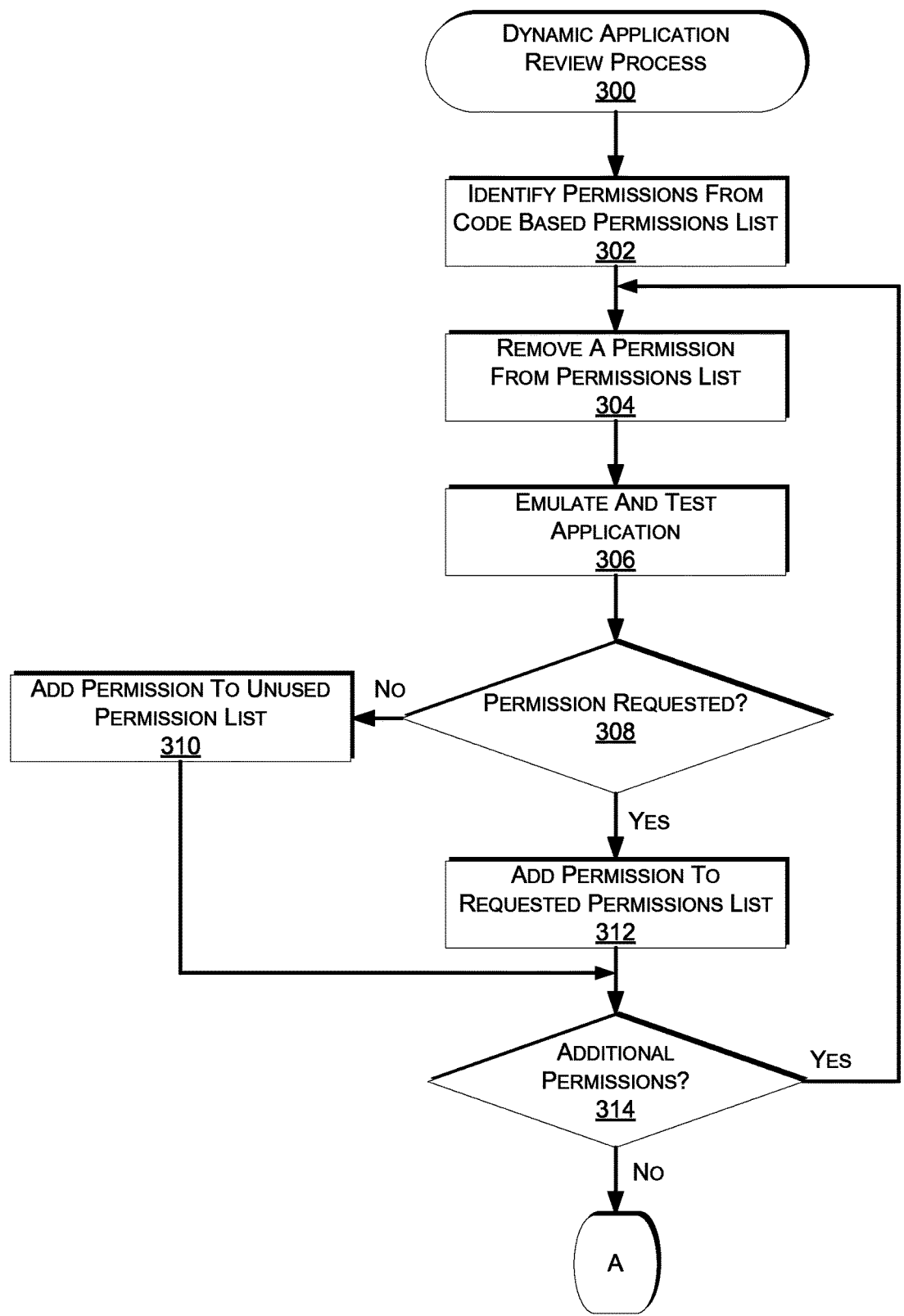
FIGS. 3-4 are a flow diagram of an example process for dynamic review of an application to identify features requested by the application when the application is running, in accordance with an implementation.
Figure 4:
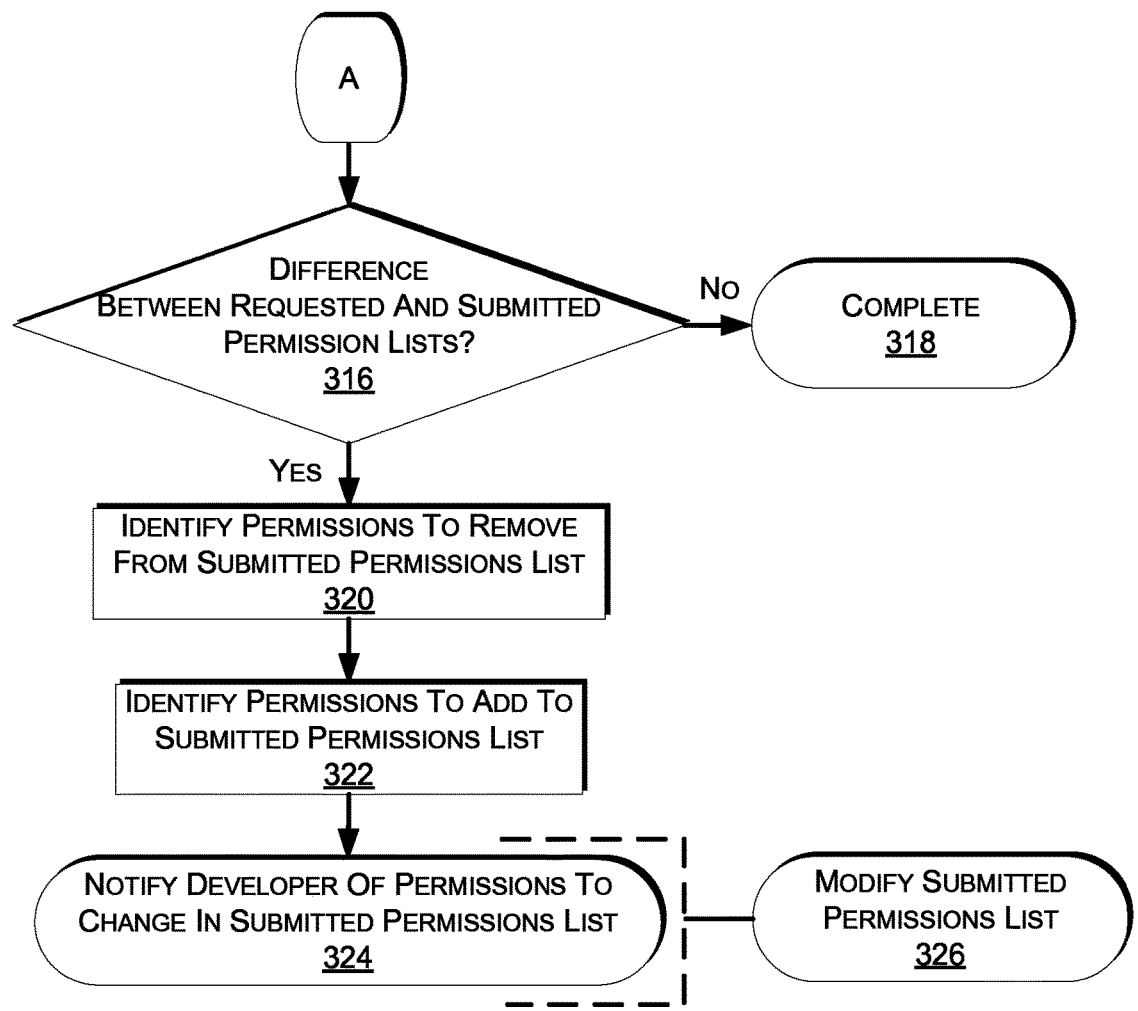

FIGS. 3-4 are a flow diagram of an example process 300 for dynamic review of an application to identify resources requested by the application during execution, in accordance with an implementation. The example process 300 begins upon identification of a completed code based permissions list, such as the code based permissions list generated by the application code review process 200. In an alternative implementation, the code based permission list used in the example dynamic application review process 300 may be the submitted permissions list provided by a developer or other entity when submitting an application for review by the application review service 106.

The identified code based permissions list may be used as the permissions allowed by the application when it is running. To identify the permissions from the code based permissions list that are needed for the application to run properly, the example process 300 may remove one of the permissions from the permissions list, as in 304. With a permission removed, the application may be run such that the segment of the code that should result in the feature associated with the removed permission is executed. In some implementations, the application may be run in a virtual environment in which a device is emulated. In other implementations, the application may be run on a physical device. In running the application, the example process 300 may perform a series of steps that will progress the application toward the segment of code that references the feature for which a permission has been removed. In still other implementations, the application may first be run on an emulator and if it fails or otherwise does not properly operate during processing of the example process 300, it may be run again on an actual device.

After running the application, a determination is made as to whether the application requested access to the feature for which the permission was removed from the permissions list. Determining if the feature was requested may be done by monitoring the behavior of the application as it runs. For example, if the application fails, has a fatal exception, forces closure, generates a log file indicating a denied request to a feature, it may be determined that the application requested access to the feature. If the application does not fail or provide some other indication that it was unable to access the feature associated with the removed permission, it may be determined that the permission is not necessary for proper operation of the application. If it is determined that the application does not request the feature associated with the removed permission, the permission may be added to an unused permissions list, as in 310. However, if it is determined that the application does request the feature for which the permission has been removed, the permission may be added to a requested permissions list, as in 312.

After running an application to determine if the feature for which the permission was removed from the permissions list is needed for the application to run properly, a determination is made as to whether additional permissions included in the code base permissions list need to be processed, as in 314. If it is determined that additional permissions included in the code based permissions list need to be processed, the example process 300 returns to block 304 and continues. If it is determined that all permissions included in the code based permission list have been processed, a determination is made as to whether there is a difference between the requested permissions list and the submitted permissions list, as in 316. If it is determined that there are no differences between the requested permissions list and the submitted permissions list, the example process 300 completes, as in 318.

However, if it is determined that a difference between the requested permissions list and the submitted permissions list exists, the permissions that should be removed from the submitted permissions list are identified, as in 320. Permissions to be removed from the submitted permissions list are those permissions that the example process 300 has determined are not necessary for the application to run properly but are included in the submitted permissions list. In addition, permissions that are to be added to the submitted permissions list may also be identified, as in 322. Permissions to be added to the submitted permissions list are those permissions identified by the example process 300 that are necessary for the application to run properly but are not included in the submitted permissions list.

Based on the identified permissions that are to be added and/or removed from the submitted permissions list, the example process 300 may reject the submitted application and notify the developer or other entity as to the changes that need to be made to the submitted permissions list, as in 324. Notifying the developer or other entity that submitted the application of the changes that need to be made to the submitted permissions list provides the ability for the developer to quickly prepare and generate an updated application package that may then be resubmitted to the application review service 106. In an alternative implementation, rather than notifying the developer or other entity of the changes to be made to the submitted permissions list, the example process 300 may modify or otherwise replace the submitted permissions list with the permissions identified in the requested permissions list.

In still other implementations, the example process 300 may omit the process steps associated with blocks 316-326 and upon determining that all permissions included in the code base permissions list have been processed, may generate a complete list of permissions that are needed for the application to run properly. This list of permissions may then be provided to a developer or other entity that submitted the application for review or added to the application package as the submitted permissions list. In such an implementation, the application review service 106 may be utilized during development of an application to accurately generate the submitted permissions list for use in running the application. Alternatively, in some implementations, the application review service 106 may not require a submitted permissions list from the developer or other entity that submitted the application and may instead use the permissions identified by the application review service 106 in performing the example processes 200-300 as the submitted permissions list.

Figure 5:
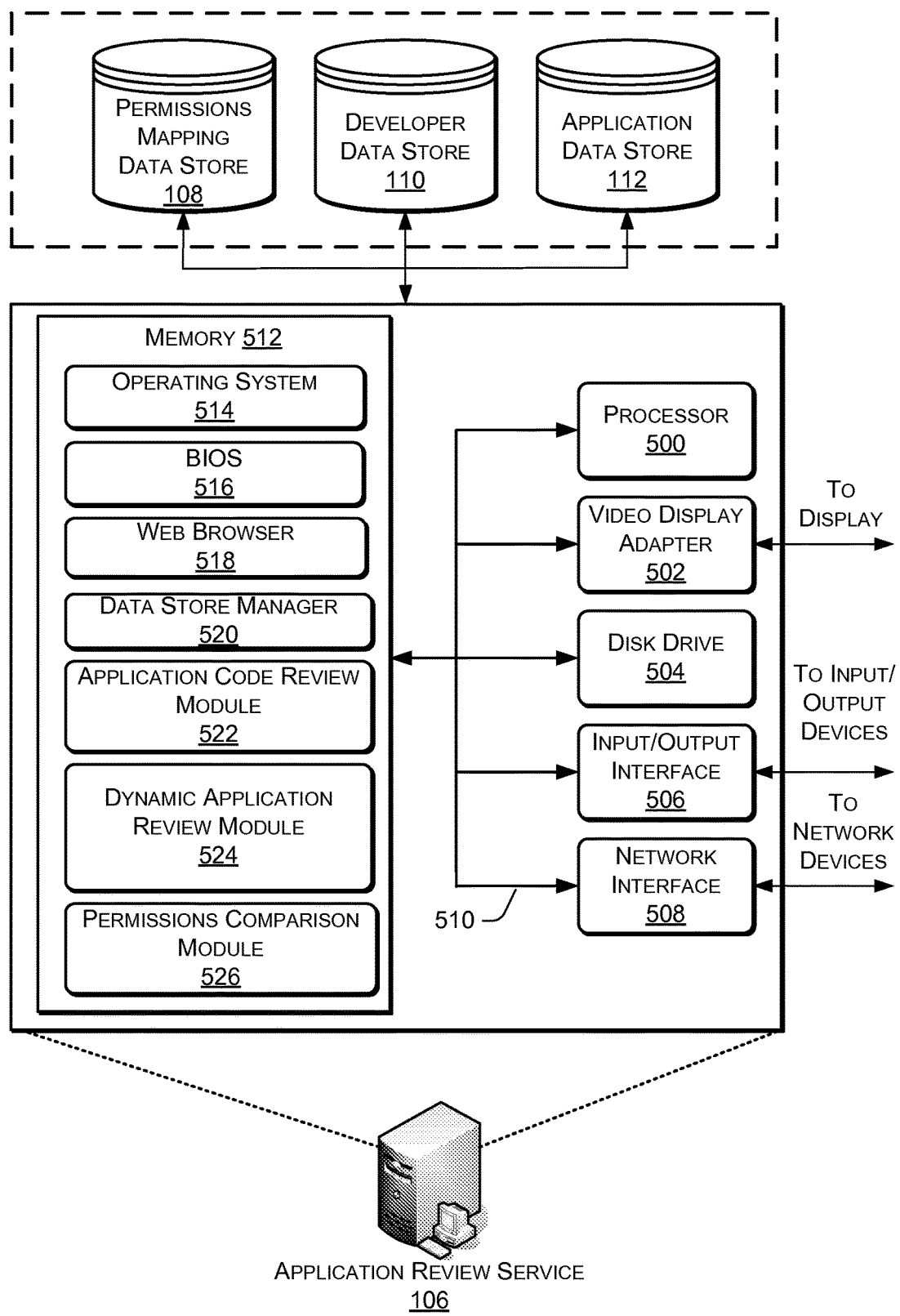
FIG. 5 is a pictorial diagram of an example implementation of a server system that may be used with the implementations described herein.

FIG. 5 is a pictorial diagram of an example implementation of the application review service 106, which is implemented as a server. While the application review service is described as a single server system, it will be appreciated that any number of servers may be used to implement the application review service 106. The application review service 106 includes a processor 500, such as one or more redundant processors, a video display adapter 502, a disk drive 504, an input/output interface 506, a network interface 508, and a memory 512. The processor 500, the video display adapter 502, the disk drive 504, the input/output interface 506, the network interface 508 and the memory 512 may be communicatively coupled to each other by a communication bus 510.

The video display adapter 502 provides display signals to a local display (not shown in FIG. 5) permitting an operator of the application review service 106 to monitor and configure operation of the application review service 106. The input/output interface 506 likewise communicates with external input/output devices not shown in FIG. 5, such as a mouse, keyboard, scanner, or other input and output devices that can be operated by an operator of the application review service 106. The network interface 508 includes hardware, software, or any combination thereof, to communicate with other computing devices. For example, the network interface 508 may be configured to provide communications between the application review service 106 and other computing devices, such as the client device 102, via the network 104, as shown in FIG. 1.

The memory 512 generally comprises random access memory (RAM), read-only memory (ROM), flash memory, and/or other volatile or permanent memory. The memory 512 is shown storing an operating system 514 for controlling the operation of the application review service 106. A binary input/output system (BIOS) 516 for controlling the low-level operation of the application review service 106 is also stored in the memory 512.

The memory 512 additionally stores program code and data for providing network services that allow client devices 102 to exchange information and application packages with the application review service 106. Accordingly, the memory 512 may store a browser application 518. The browser application 518 comprises computer executable instructions, that, when executed by the processor 500, generate or otherwise obtain configurable markup documents, such as Web pages. The browser application 518 communicates with a data store manager application 520 to facilitate data exchange between the permissions mapping data store 108, the developer data store 110, and the application data store 112, or any combination thereof, and client devices, such as the client device 102 shown in FIG. 1.

Additionally, the memory 512 includes an application code review module 522, a dynamic application review module 524, and a permissions comparison module 526. The modules 522-526 may be executable by the processor 500 to implement one or more of the functions of the server system 102. In one implementation, each of the modules 522-526 may represent computer-executable instructions embodied in one or more software programs stored in the memory 512. In another implementation, the modules 522-526 can represent hardware, software instructions, or a combination thereof.

In one implementation, the application code review module 522 is configured to identify features requested in the code of a submitted application and determine the corresponding permissions for those features through communication with the permissions mapping module 108. In one implementation, the application code review module 522 may perform at least a portion of the example process 200, discussed above.

In one implementation, the dynamic application module 524 is configured to run a submitted application to determine which of the permissions identified by the application code review module 522 are actually utilized and needed for the application to run properly. In one implementation, the dynamic code review module 524 may perform at least a portion of the example process 300, discussed above.

The permission comparison module 526, in one implementation, is configured to compare the permissions identified by the dynamic application module 524 to permissions submitted with the application to identify any differences. In one implementation, the permissions comparison module 526 may perform at least a portion of the example process 300, discussed above.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for verifying one or more permissions of a plurality of permissions associated with an application are requested by the application, the method comprising:
under control of one or more computing devices configured with executable instructions,
determining the plurality of permissions that are to be accessible by the application based at least in part on a review of a code of the application;
removing a permission of the plurality of permissions such that the permission is unavailable to the application;
running the application;
monitoring the running application to determine that the permission is not actually requested by the running application; and
sending a notification that is indicative of the permission not being requested by the application.

2. The method as recited in claim 1, wherein determining the plurality of permissions includes automatically reviewing the code of the application to identify requests for features.

3. The method as recited in claim 2, wherein automatically reviewing the code of the application to identify requests for features includes automatically reviewing the code of the application to identify requests for at least one of a code on a device, data on the device, data accessible by the device, or a service accessible by the device.

4. The method as recited in claim 1, wherein running the application includes running the application on an emulation of a device.

5. The method as recited in claim 1, further comprising:
including the permission in a second plurality of permissions subsequent to the permission being requested by the running application.

6. The method as recited in claim 5, further comprising:
determining a difference between the second plurality of permissions and a submitted permissions list; and
wherein determining the difference includes identifying a permission included in the submitted permissions list that is not included in the second plurality of permissions.

7. The method of claim 1, wherein monitoring the running application to determine that the permission is not actually requested by the running application occurs subsequent to removing the permission.

8. The method of claim 1, wherein the plurality of permissions are enabled for the application prior to the permission being removed.

9. One or more non-transitory computer readable media storing computer-executable instructions that, when executed on one or more processors, cause the one or more processors to perform acts comprising:
receiving an application and a permissions list identifying permissions for the application;
identifying a permission of the permission list that is indicated to be accessible to the application;
removing the permission such that the permission is unavailable to the application;
running the application;
monitoring the running application to determine that the removed permission is not actually requested by the running application; and
outputting a notification to remove the permission from the permission list.

10. The one or more non-transitory computer readable media as recited in claim 9, wherein the computer-executable instructions, when executed by the one or more processors, further cause the one or more processors comprising: acts comprising:
subsequent to removing the permission, removing a second permission of the permission list such that the permission is unavailable to the application;
further running the application; and
including the second permission in a requested permissions list subsequent to determining that the second permission was actually requested by the running application.

11. The one or more non-transitory computer readable media as recited in claim 10, wherein the computer-executable instructions, when executed by the one or more processors, further cause the one or more processors to perform acts comprising:
identifying a difference between the requested permissions list and the submitted permissions list.

12. The one or more non-transitory computer readable media as recited in claim 10, wherein determining that the second permission is actually requested by the running application includes:
identifying at least one of a failure of the application, a fatal exception, a force closure of the application, or a log file.

13. The one or more non-transitory computer readable media as recited in claim 9, wherein determining the permissions list is performed automatically by a device running the application.

14. The one or more non-transitory computer readable media as recited in claim 9, wherein the computer-executable instructions, when executed by the one or more processors, further cause the one or more processors to perform acts comprising:
modifying the permissions list to include only permissions that are actually requested by the application when the application is running.

15. A non-transitory computer readable storage medium storing instructions for verifying one or more permissions of a plurality of permissions are requested by an application when the application is running, the instructions when executed by one or more processors further causing the one or more processors to at least:
process a code of the application to identify a plurality of permissions associated with features identified in the code;
remove a permission of the plurality of permissions such that the permission is unavailable to the application;
run the application;
monitor the running application to determine that the permission is not actually requested by the running application; and
sending a notification that is indicative of the permission not being requested by the application.

16. The non-transitory computer readable storage medium of claim 15, wherein the code is processed automatically by a device that is used to run the application.

17. The non-transitory computer readable storage medium of claim 15, wherein at least one of the plurality of permissions is identified based at least in part on an identification of an application programming interface call included in the code of the application.

18. The non-transitory computer readable storage medium of claim 15, the instructions when executed by the one or more processors further causing the one or more processors to at least:
  determine a difference based at least in part on a requested permissions list and a submitted permissions list associated with the application.

19. The non-transitory computer readable storage medium of claim 18, the instructions when executed by the one or more processors further causing the one or more processors to at least:
  send to a provider of the application an identification of the difference.

20. The non-transitory computer readable storage medium of claim 15, the instructions when executed by the one or more processors further causing the processor one or more processors to at least:
  include a requested permissions list in an application package with the application, wherein the requested permission list does not include the permission.

* * * * *

UNITED STATES PATENT AND TRADEMARK OFFICE
CERTIFICATE OF CORRECTION

PATENT NO. : 9,665,465 B1  
APPLICATION NO. : 13/681404  
DATED : May 30, 2017  
INVENTOR(S) : Akshay Jain and Nitin Kumar Grover Page 1 of 1

It is certified that error appears in the above-identified patent and that said Letters Patent is hereby corrected as shown below:

In the Claims

Column 11:
Line 66, Claim 9, "removed permission is not actually requested by the" should read as, --permission is not actually requested by the--.

Column 12:
Lines 4-7, Claim 10, "media as recited in claim 9, wherein the computer-executable instructions, when executed by the one or more processors, further cause the one or more processors comprising: acts comprising:" should read as, --media as recited in claim 9, wherein the computer-executable instructions, when executed by the one or more processors, further cause the one or more processors to perform acts comprising:--.

Signed and Sealed this  
Thirtieth Day of August, 2022

Katherine Kelly Vidal  
*Director of the United States Patent and Trademark Office*